United States Patent Office 3,655,729
Patented Apr. 11, 1972

3,655,729
PROCESS FOR PREPARING ESTERS OF TEREPHTHALIC ACID
Verne R. Rinehart, Akron, Ohio, assignor to The General Tire & Rubber Company, Akron, Ohio
No Drawing. Filed July 18, 1968, Ser. No. 745,677
Int. Cl. C07c 69/82
U.S. Cl. 260—475 P          2 Claims

ABSTRACT OF THE DISCLOSURE

The invention relates to the preparation of polyesters from terephthalic acid and glycol using a fluid mixture of glycol and terephthalic acid as starting material. The fluid mixtures contain glycol to terephthalic acid in molar ratios of from about 0.9:1 to 1.3:1, the terephthalic acid being a mixture of particles of different sizes.

---

This invention relates to an improved process for preparing linear polyesters. More particularly the invention relates to a process which can be operated as a batch process or as a continuous process to produce high molecular weight linear polyesters of high quality.

High molecular weight linear polyesters are presently produced on a commercial scale by the ester interchange process. For example, in the production of highly polymeric linear polyethylene terephthalate, the dimethyl esters of terephthalic acid are heated with an excess of ethylene glycol in the presence of an ester interchange catalyst at a temperature of about 155 to 230° C. at atmospheric pressure until approximately the theoretical amount of methyl alcohol has been liberated. The excess glycol is then distilled off and the product remaining is polymerized by condensation reaction with the elimination of glycol by heating in the presence of a catalyst at elevated temperatures and under reduced pressures until a high molecular weight product is formed.

Polymeric ethylene terephthalate can be produced by heating terephthalic acid with ethylene glycol to form the diglycol ester which can then be polymerized by heating in the presence of a catalyst under reduced pressures to form a high molecular weight product. This process, however, has not been successful on a commercial scale because the esterification of terephthalic acid with ethylene glycol at atmospheric pressure requires extended times of heating at elevated temperatures and also requires the use of a large excess of glycol. It has been attempted to produce polyethylene terephthalate by reacting ethylene glycol with terephthalic acid under superatmospheric pressure at elevated temperatures but this process suffers from the disadvantage that some of the glycol is converted into polyethers and other products and, in addition, a large excess of glycol must be used. Polyethers are known to contribute to color and to instability of high molecular weight linear polyethylene terephthalate. Also, ether linkages in the polyester cause the polyester melting point to be depressed, and reduce the stability of the polymer.

It is an object of the present invention to provide an improved process for producing linear polyesters. It is another object of the invention to provide a process for producing linear polyesters starting with free dicarboxylic acids and free glycol as reactants. It is another object to provide a continuous process for producing highly polymeric linear polyester. Still another object of the invention is to provide a process for preparing polymeric linear polyesters in which a minimum amount of catalyst is used and the high molecular weight linear polyester resin produced contains only a small amount of catalyst residue. Other objects will appear hereinafter as the description of the invention proceeds.

In a process for preparing polyethylene terephthalate using ethylene glycol and terephthalic acid as reactants it is desirable to avoid the use of an excess of glycol and to use these materials in the molar ratio of 1:1 since this is the theoretical ratio required to form high molecular weight polymer. The use of excess glycol is undesirable because it wastes heat, reduces the productivity of the reactor and must be removed and recovered in the process.

According to prior art processes the theoretical 1:1 ratio may be approached using water or other diluent to provide sufficient fluidity to the glycol-terephthalic acid mixture that it can be stirred and to enable heat to be imparted evenly and efficiently through the mixture. However, the use of such diluents is not satisfactory. Diluents, of course, must be removed somewhere in the process, and their use is costly, lowering reactor productivity and requiring heat to maintain them at the temperature of the reactants.

It is known in the art that glycol-terephthalic acid mixtures having little excess glycol form doughy pastes that can be stirred only with great difficulty, and such pastes have poor heat transfer characteristics. Such mixtures are difficult to heat uniformly and resin prepared from such mixtures is discolored due to some decomposition caused by local overheating.

In British Pat. 990,642 a process is described in which terephthalic acid and ethylene glycol are mixed in a molar ratio of from 1:2 to 1:15, the excess glycol being removed by distillation until a molar ratio of not more than 1:1.9 is obtained and the mixture then reacted under superatmospheric pressure. The large excess of glycol is used according to the patent to provide a mixture which can be mixed without the use of excessive power. The patent points out that when the molar ratio is less than 1.5, as is the case in which 80 parts of terephthalic acid and 40 parts of ethylene glycol are used, the mixture does not become a slurry, and charging of the mixture into a reactor becomes very difficult. In this case the terephthalic acid and ethylene glycol must be charged separately. The patent also points out that in such a case the usual paddle shaped mixer vanes are not satisfactory and it is necessary to employ kneader type vanes or vanes having similar effects, and that the power necessary for mixing in the initial stages is very great.

British Pat. 1,060,214 discusses the intractable doughy paste formed by glycol-terephthalic acid mixtures and says that a mixture of 1.3 mols of ethylene glycol and 1.0 mol of terephthalic acid forms a white powder. According to the patent the initial doughy part can be thinned by homogenization of mixtures of glycol with terephthalic acid in the ratio of from 2:1 to 1:1 with the limit of 1:1 being approached in the use of glycols having 6 or more carbon atoms. The patent further states that with ethylene glycol the doughy pastes are produced by use of a molar ratio of from 1.3–2.0:1 having an initial Brookfield viscosity at from room temperature to 72° C. of above 300,-000 centipoises when the ratio of 1.3:1 is used.

Thus, according to the prior art, a fluid mixture of the theoretical target ratio of 1:1 of ethylene glycol to terephthalic acid has not been obtained and it is not practical to use such a ratio in the esterification of terephthalic acid.

Now it has unexpectedly been found that fluid mixtures of ethylene glycol with terephthalic acid can be made using the glycol and the acid in molar ratios of 1:1 and even lower, as for example 0.8:1, when the terephthalic acid consists of particles of different sizes and the distribution of the particles of different sizes is such that the large particles comprise from about 35 to about 90 percent by weight of the total weight of the particles present, the remainder being smaller particles, a major portion of which are approximately 4/10 or less of the size of the larger particles and constitute more than 90 percent of the total number of particles present. In this invention the terephthalic acid should consist of particles having at least two different sizes of particle, the distribution of the particles of different sizes being such that the particles of different sizes are present in the ratios indicated.

For example, to prepare a fluid mixture of ethylene glycol and terephthalic acid in which the glycol and acid are present in the molar ratio of 1:1 and the terephthalic acid consists of particles of two sizes, larger particles should comprise from 35 to 90 percent by weight of the total weight of the terephthalic acid particles present. Smaller particles of terephthalic acid comprise the major portion of the remainder of the acid and these particles should be of a size such that they are approximately 4/10 or less of the average size of the larger particles. In mixtures of terephthalic acid wherein the particles consist of more than two sizes a fluid mixture with low glycol ratios is obtained when the sizes of succeeding smaller particles have an average size of about 4/10 or less of the size of the next larger particle. In such mixtures of acid the relationship is found to be that the larger particles should comprise from about 40 to about 90 weight percent of the acid, the smaller particles correspondingly comprise from about 60 to about 10 weight percent of the acid and the smaller particles comprise at least 90 percent of the total numbers of particles present, the smaller particles having a size such that they are 4/10 or less of the size of the next larger particle.

To illustrate the invention the following examples are set forth.

EXAMPLE 1

A sample of terephthalic acid on sifting through U.S. standard screen was found to be comprised of 66 percent by weight of particles having a size such that they passed through a 20 mesh sieve and were retained on a 100 mesh sieve, 13 percent by weight of acid particles that passed through a 100 mesh and were retained on 325 mesh and 21 percent by weight of acid particles passed through 325 mesh screen was mixed with ethylene glycol in the ratio of one mol of glycol to one mol of acid at room temperature. The mixture had a Brookfield viscosity at room temperature of 14,000 centipoises. This viscosity is the yield viscosity of the mixture. At high shear rates the Brookfield viscosity of the mixture measured at 30 r.p.m. was 7500 centipoises.

EXAMPLE 2

A sample of terephthalic acid which consisted chiefly of relatively large particles having a size less than 0.0342 inch and above 0.0098 inch formed a slurry of relatively low viscosity with 1.4 mols of glycol per mol of terephthalic acid. However, when the amount of glycol was reduced to one mol of glycol per mol of terephthalic acid the mixture was so stiff that its viscosity could not be measured.

A sample of commercially obtainable terephthalic acid was sifted through a U.S. standard screen and showed the following distribution of sizes:

TABLE I

| Screen mesh No. passed through | Size of screen opening (inches) | Retained on | Percent |
| --- | --- | --- | --- |
| 20 | 0.0342 | 40 | 92.1 |
| 40 | 0.0614 | 60 | 5.8 |
| 60 | 0.0098 | | 1.88 |

A ground sample of terephthalic acid had the following sieve analysis in U.S. standard screens:

TABLE II

| Screen mesh No. passed through | Size of screen opening (inches) | Retained on | Percent |
| --- | --- | --- | --- |
| | | 40 | 0.2 |
| 40 | 0.0164 | 50 | 0.2 |
| 50 | 0.0116 | 70 | 1.0 |
| 70 | 0.0082 | 80 | 0.8 |
| 80 | 0.0069 | 100 | 1.4 |
| 100 | 0.0058 | 140 | 4.4 |
| 140 | 0.0041 | 200 | 9.0 |
| 200 | 0.0029 | 250 | 8.0 |
| 250 | 0.0024 | 325 | 14.0 |
| 325 | 0.0017 | | 61.0 |

Blends of the above unground and ground samples of acids were made and mixed with various ratios of glycol. The viscosity of each mixture was measured at room temperature with a Brookfield viscosimeter. The data obtained are tabulated below:

TABLE III

| Blends of acids unground/ground | Viscosity of glycol-acid mixtures glycol:terephthalic acid ratio | | | | | |
| --- | --- | --- | --- | --- | --- | --- |
| | 1.0:1.0 | 1.2:1.0 | 1.3:1.0 | 1.4:1.0 | 1.6:1.0 | 2.0:1.0 |
| 100/0 | | | | 7,000 (3) | 4,000 (3) | |
| 90/10 | | | 4,400 (3) | 3,745 (2) | 2,270 (2) | |
| 80/20 | 18,000 (3) | 5,040 (3) | 4,965 (2) | 3,570 (2) | 1,985 (2) | |
| 70/30 | 13,600 (3) | 7,680 (3) | 5,820 (3) | 4,730 (2) | 2,620 (2) | |
| 40/60 | | 29,000 (4) | 16,640 (3) | 12,540 (3) | 8,860 (3) | |
| 0/100 | | | | | 75,000 (4) | 25,000 (4) |

NOTE.—In the above table the figure in parentheses indicates the Brookfield spindle size number of the spindle used. Viscosity was measured at 6 r.p.m. at room temperature.

In Table III above the particle distribution of the 100/0 sample will be that shown in Table I. The 0/100 sample will have the distribution shown in Table II above. The 90/10 sample will be composed of 90 percent of the acid of Table I and 10 percent of the acid of Table II and consequently a distribution as follows:

TABLE IV

| Screen mesh No. passed through | Size of screen opening (inches) | Retained on | Percent |
| --- | --- | --- | --- |
| 20 | 0.0342 | 40 | 82.91 |
| 40 | 0.0164 | 60 | 5.28 |
| 60 | 0.0098 | 80 | 1.83 |
| 80 | 0.0069 | 100 | 0.14 |
| 100 | 0.0058 | 140 | 0.44 |
| 140 | 0.0041 | 200 | 0.90 |
| 200 | 0.0029 | 250 | 0.80 |
| 250 | 0.0024 | 325 | 1.40 |
| 325 | 0.0017 | | 6.10 |

The remaining mixtures will have the proportions of the two acids indicated and their particle distribution can be calculated from the above table.

A simple qualitative measurement which will indicate whether or not a mixture made of samples of terephthalic acid having different particle sizes will form a low viscosity mixture with ethylene glycol is that if the total volume occupied by the dry mixture of the different acids of different particle sizes is less than 90 percent of the total volume occupied by the dry particles when they are maintained separately in different containers, the mixture of acid particles will form low viscosity mixtures with low molar ratios of ethylene glycol. As corollary to this qualitative test it may be said that the greater the difference in the two volumes the lower the viscosity of the slurry obtained when the acid is mixed with glycol.

The temperature of the mixture has been found to have an effect on the viscosity of the slurries. Thus, viscosity generally decreases as the temperature of the mixture increases and passes through a minimum, after which it increases rapidly. The minimum has been found to depend to some extent on the ratio of glycol to acid. Thus for a ratio of glycol to acid of 1.2:1 the minimum has been found to be 65° C. for a two particle mixture containing 65 percent of the large particles and 35 percent small particles. For a mixture of glycol and acid in the ratio of 1.3:1 the minimum occurs at 80° C. for a two particle mixture, the two sizes present being in the ratio of 65 percent of large particles and 35 percent of small particles.

Polyesters are prepared from the glycol terephthalic acid mixtures of the invention by esterification and condensation reactions. The ease of handling the fluid slurries allows the use of lower ratios of glycol to acid and facilitates fast charging of the reaction vessels. The following example illustrates the esterification reaction using the fluid slurry of the invention.

EXAMPLE 3

77.8 pounds of terephthalic acid which was comprised of 65 percent by weight of the unground acid and 35 percent by weight of the ground acid shown above was mixed with 37.8 pounds of ethylene glycol (molar ratio of glycol to terephthalic acid of 1.3:1). The fluid slurry formed was run into a reactor which was equipped with a distilling column and an agitator. The slurry was stirred and heated under a pressure of 35 pounds per square inch gauge pressure to a temperature of 245° C. as the water distilled from the mixture. At 3½ hours the evolution of water was finished. At this point the esterification reaction was complete.

In the above example the glycol-terephthalic acid slurry was easily run into the reactor. This may be contrasted with prior practices in which the terephthalic acid required a large excess of glycol to form a fluid mixture to charge into a reaction vessel or when the glycol and terephthalic acid were used in low molar ratios the mixtures were very viscous or formed dry paste and it was necessary to charge the reactants separately into the reaction vessel.

The preparation of the high molecular weight resins from the esterification product is carried out in accordance with the usual known techniques. Thus a condensation catalyst such as antimony trioxide, litharge or titanium glycolate is added prior to the condensation reaction. The reactions are preferably carried out in the absence of oxygen generally in an atmosphere of an inert gas such as nitrogen or the like in order to lessen darkening and to obtain a high molecular weight pale or colorless product. The polymerization is carried out under reduced pressure, generally below 10 millimeters of mercury pressure, and usually at or below one millimeter of mercury pressure, at a temperature in the range of from 260 to 290° C.

The invention has been particularly illustrated with respect to the use of ethylene glycol. Other polymethylene glycols such as tetramethylene glycol can also be used.

The glycol-terephthalic acid slurries of the invention are particularly useful in continuous polymerization processes wherein glycol and acid are continuously added and product is continuously withdrawn. These low viscosity mixtures can be poured or they may be pumped or otherwise conveyed into a reaction system. They can be stirred without the use of excessive power and because the ratios of materials approach theoretical ratios little glycol need be recovered from the esterification reaction.

While certain representative embodiments and details have been shown for the purpose of illustrating the invention it will be apparent to those skilled in this art that various changes and modifications may be made therein without departing from the spirit or scope of the invention.

What I claim is:

1. In the process of preparing esters from ethylene glycol and terephthalic acid by esterification the improvement which comprises forming a fluid mixture of ethylene glycol and terephthalic acid having a viscosity of less than 30,000 centipoises measured at room temperature and in which the molar ratio of glycol to acid is from 0.9:1 to 1.3:1, the terephthalic acid being comprised of from 40 to 90 percent by weight of particles smaller than 0.0342 inch and larger than 0.0164 inch and from 60 to 10 percent by weight of smaller particles having a size smaller than 0.0164 inch and of which the major portion is smaller than 0.0058 inch, conveying said mixture into a reactor and heating and reacting the mixture to form glycol esters of terephthalic acid.

2. A new composition consisting of a mixture of ethylene glycol and terephthalic acid in the molar ratio of from 0.9:1 to 1.3:1 of ethylene glycol to terephthalic acid, said mixture having a viscosity of less than 30,000 centipoises measured at 25° C., the terephthalic acid being comprised of from 40 to 90 percent by weight of particles smaller then 0.0342 inch and larger than 0.0164 inch and from 60 to 10 percent by weight of smaller particles having a size smaller than 0.0164 inch and of which the major portion is smaller than 0.0058 inch.

References Cited

UNITED STATES PATENTS 3,431,243  3/1969  Uno et al. _____ 260—475

LORRAINE A. WEINBERGER, Primary Examiner

E. J. SKELLY, Assistant Examiner

U.S. Cl. X.R.

252—188.3; 260—75 M, 515 P

PO-1050
(5/69)

UNITED STATES PATENT OFFICE
CERTIFICATE OF CORRECTION

Patent No. 3,655,729           Dated    April 11, 1972

Inventor(s) Verne R. Rinehart

It is certified that error appears in the above-identified patent and that said Letters Patent are hereby corrected as shown below:

Column 1, line 4, after "assignor to" "The General Tire & Rubber Company" should be changed to -- The Goodyear Tire & Rubber Company --.

Signed and sealed this 3rd day of April 1973.

(SEAL)
Attest:

EDWARD M. FLETCHER, JR.
Attesting Officer

ROBERT GOTTSCHALK
Commissioner of Patents